United States Patent
Ng

(10) Patent No.: US 11,766,027 B1
(45) Date of Patent: *Sep. 26, 2023

(54) ANIMAL WASTE BAG

(71) Applicant: SIR Design LLC, Flushing, NY (US)

(72) Inventor: Mun Jen Ng, Flushing, NY (US)

(73) Assignee: SIR Design LLC, Flushing, NY (US)

( * ) Notice: Subject to any disclaimer, the term of this patent is extended or adjusted under 35 U.S.C. 154(b) by 551 days.

This patent is subject to a terminal disclaimer.

(21) Appl. No.: 16/840,351

(22) Filed: Apr. 4, 2020

Related U.S. Application Data

(63) Continuation-in-part of application No. 16/524,164, filed on Jul. 28, 2019, now Pat. No. 10,729,105, which is a continuation of application No. 16/051,153, filed on Jul. 31, 2018, now Pat. No. 10,405,522.

(60) Provisional application No. 62/540,161, filed on Aug. 2, 2017.

(51) Int. Cl.
*A01K 23/00* (2006.01)
*B65D 33/00* (2006.01)
*E01H 1/12* (2006.01)

(52) U.S. Cl.
CPC .......... *A01K 23/005* (2013.01); *B65D 33/008* (2013.01); *E01H 2001/124* (2013.01)

(58) Field of Classification Search
CPC ................ A01K 23/005; B65D 33/008; E01H 2001/124
See application file for complete search history.

(56) References Cited

U.S. PATENT DOCUMENTS

| | | | |
|---|---|---|---|
| 4,275,812 A | 6/1981 | Poncy et al. | |
| 4,902,283 A * | 2/1990 | Rojko | A47K 7/02 294/1.3 |
| 4,915,226 A | 4/1990 | Keenan | |
| 4,993,844 A | 2/1991 | Robinson et al. | |
| 5,102,234 A | 4/1992 | Levy | |
| 5,149,159 A * | 9/1992 | Bardes | E01H 1/1206 294/1.3 |
| 5,222,777 A | 6/1993 | Clonch | |
| 5,301,806 A | 4/1994 | Olson | |
| D436,236 S * | 1/2001 | Boyd | D30/162 |
| 6,203,080 B1 * | 3/2001 | Surplus | A41D 19/0075 294/1.3 |
| 6,250,829 B1 | 6/2001 | Brower et al. | |
| 6,315,696 B1 | 11/2001 | Garrioch | |
| 6,439,627 B1 * | 8/2002 | Devane | E01H 1/1206 294/1.3 |
| 6,539,549 B1 | 4/2003 | Peters, Jr. | |
| 8,672,372 B2 | 3/2014 | Dan | |
| 9,951,489 B2 * | 4/2018 | Rong | E01H 1/1206 |

(Continued)

FOREIGN PATENT DOCUMENTS

JP 2012135252 7/2012

*Primary Examiner* — Stephen A Vu
(74) *Attorney, Agent, or Firm* — Chad Peterson

(57) ABSTRACT

This invention pertains to an improvement in animal waste bags, wherein the animal waste bag is configured to hold multiple wastes in one bag and mask the tactile sensation during retrieval of multiple wastes. A wall of an animal waste bag may include a surface modification that masks the feel, temperate, and/or sensation of the animal waste during retrieval. An animal waste bag may include three or more walls, separating the bag into two or more pouches, each of which can hold animal waste.

20 Claims, 16 Drawing Sheets

(56) References Cited

U.S. PATENT DOCUMENTS

| | | |
|---|---|---|
| 10,405,522 B2 * | 9/2019 | Ng .................. A01K 23/005 |
| 10,729,105 B2 * | 8/2020 | Ng .................. B65D 33/008 |
| 2007/0206888 A1 | 9/2007 | Chang |
| 2009/0315350 A1 * | 12/2009 | Allen ................ E01H 1/1206 |
| | | 294/1.3 |
| 2011/0210571 A1 * | 9/2011 | Dan ................ A41D 19/0024 |
| | | 294/1.3 |
| 2013/0223970 A1 | 8/2013 | Surber et al. |

* cited by examiner

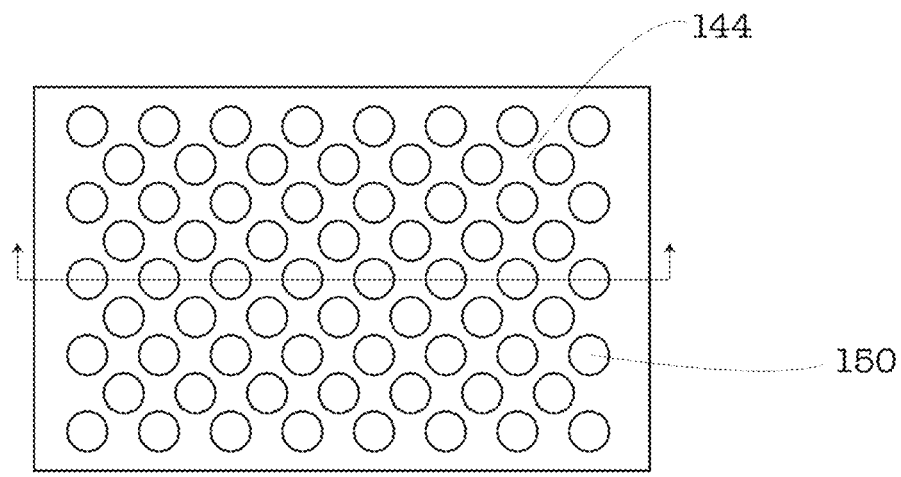
FIG. 5A
FIG. 5B
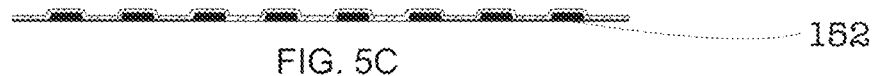
FIG. 5C
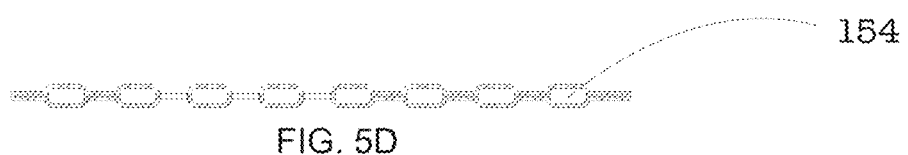
FIG. 5D
FIG. 5E
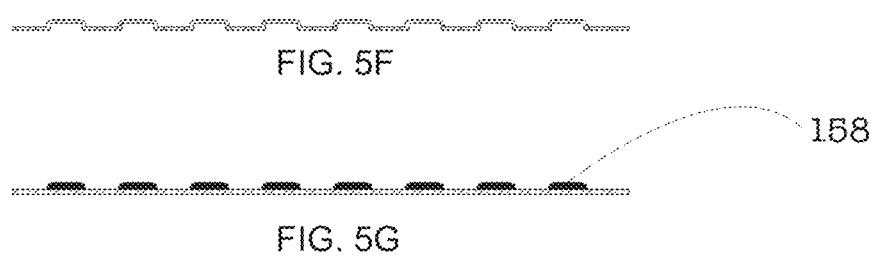
FIG. 5F
FIG. 5G

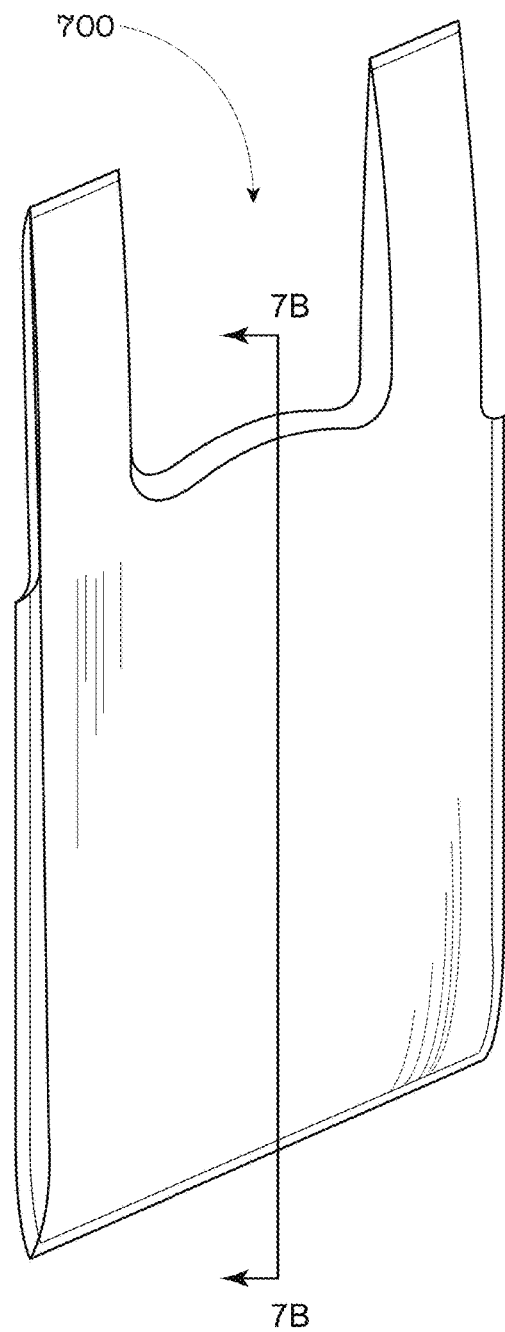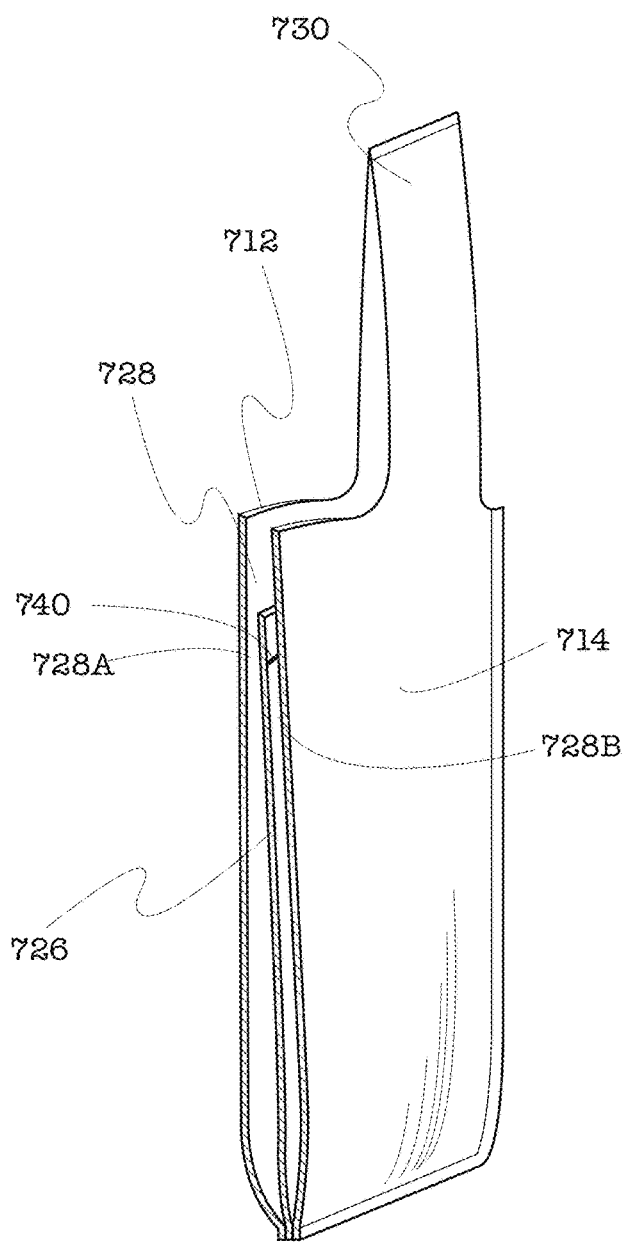
FIG. 7A
FIG. 7B

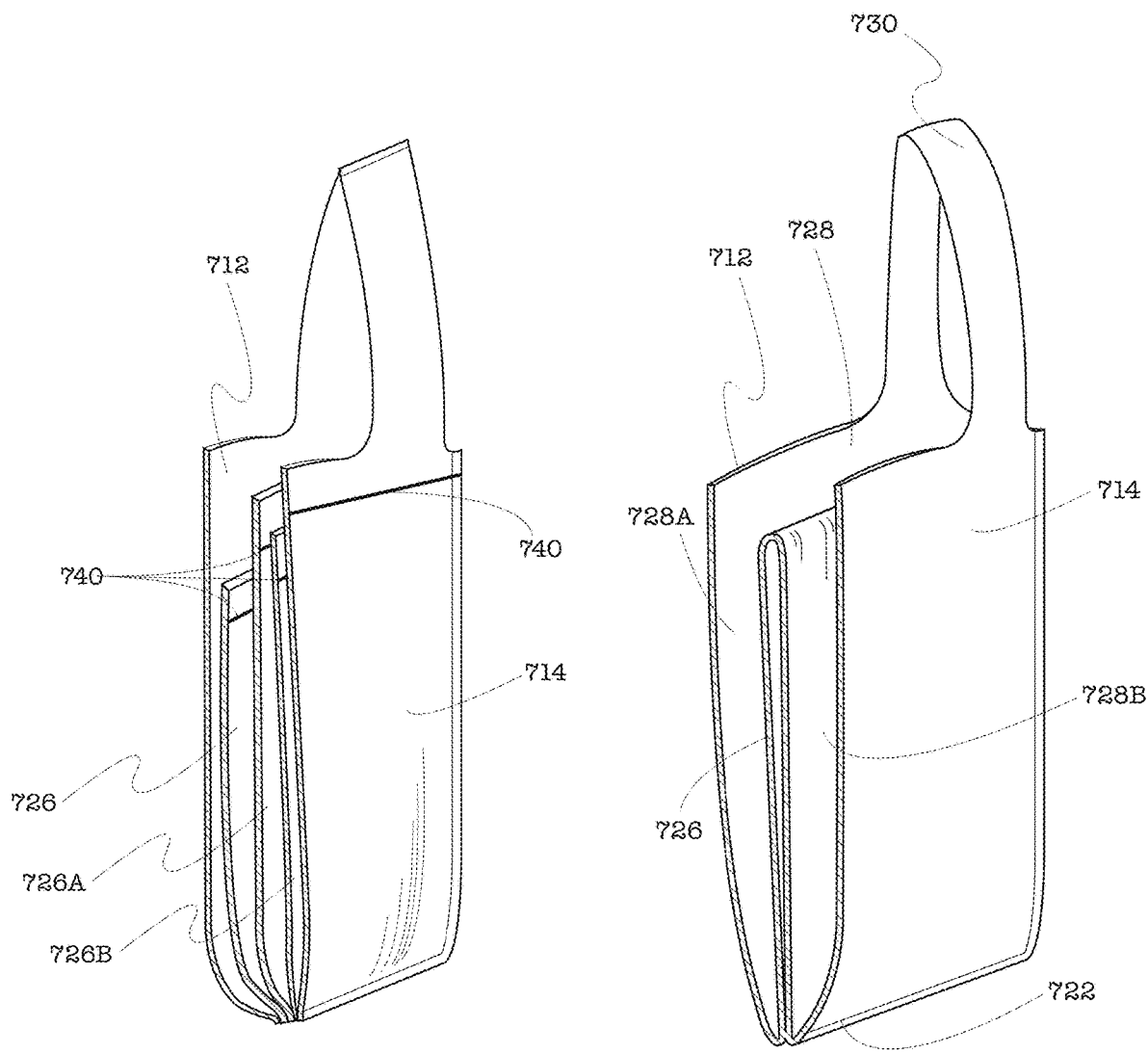

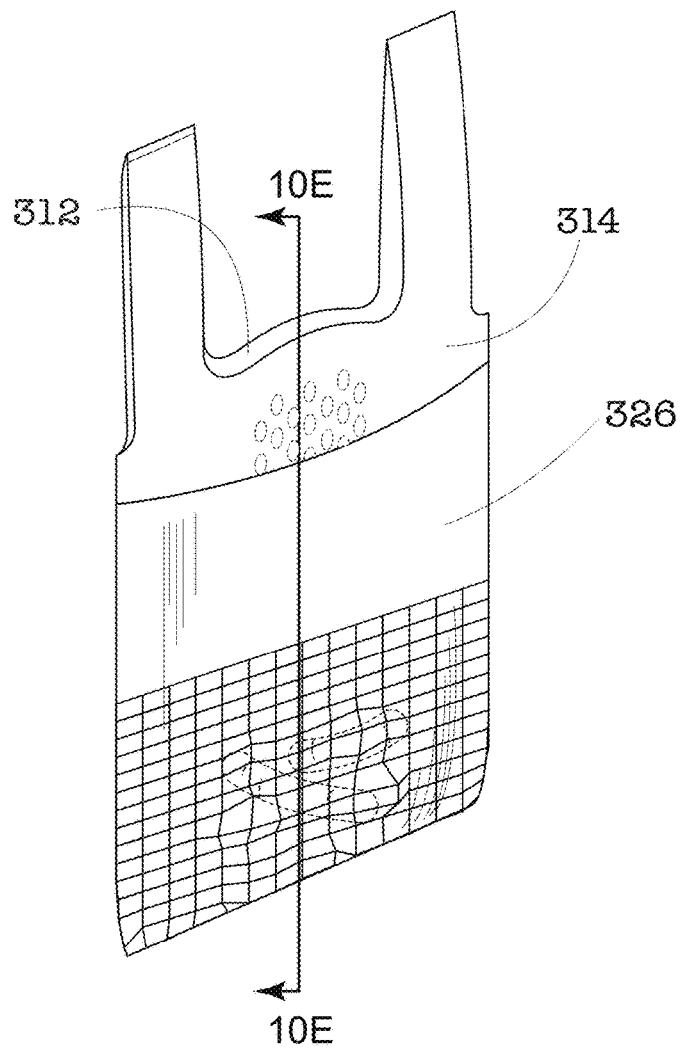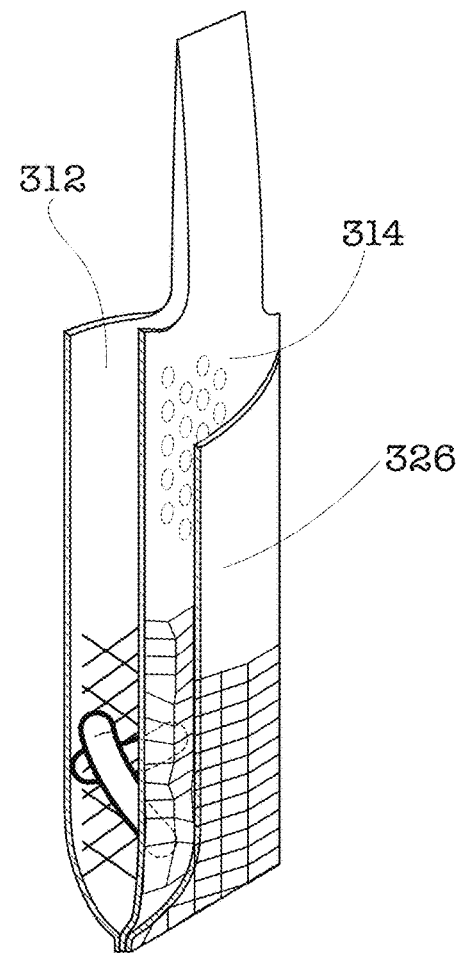
FIG. 10D
FIG. 10E

ANIMAL WASTE BAG

CROSS-REFERENCE TO RELATED APPLICATIONS

The present application is a continuation-in-part of U.S. patent application Ser. No. 16/524,164, titled "Multi-Component Reversible Animal Waste Bag," filed Jul. 28, 2019, which is a continuation of U.S. patent application Ser. No. 16/051,153, now U.S. Pat. No. 10,405,522, titled "Multi-Component Reversible Animal Waste Bag," filed Jul. 31, 2018, which claims the benefit of U.S. Provisional Patent Application No. 62/540,161, filed Aug. 2, 2017, each of which is incorporated by reference herein in its entirety.

BACKGROUND

The present invention relates generally to pet and animal products. More particularly, the present invention relates to animal waste management and disposal products.

Currently the majority of pet waste management is done with single compartment, single use plastic disposable bags, most of which are made with single ply high-density polyethylene (HDPE), low-density polyethylene (LDPE), petroleum, or plant based films which have a smooth surface.

A challenge that arises in most instances is that the plastic film material is thin and the transference of temperature and consistency of the animal waste is felt by the user when retrieving waste articles. In most cases, this causes an unpleasant feeling and promotes avoidance of cleaning up after one's pet. This avoidance may lead to violation of pet curbing laws and mental and physical discomfort. A current solution is to provide bags made of thicker plastic materials that mask the temperature and consistency of the waste matter. Another current solution is to use newspaper or other material to hide the feeling and sensation of the pet waste. One shortcoming with these solutions is that the bags of thicker material or paper do not readily bend or fold in a predictable manner in accordance with the different sizes, shape, and consistency of the waste leading to possible mishandling, poor ergonomics, and spillage of waste during retrieval.

Another challenge that arises in pet waste management is the single use plastic bag. Carrying multiple bags in preparation to walk one's dog can be burdensome. Another challenge in using single use bags is that a pet's need to relieve themselves is often unpredictable and over the course of a walk, they may exceed the number of single use bags an owner brings. This can lead to frustration, embarrassment, violation of local pet curbing laws if left unattended, and unsanitary improvisations in attempt to clean up. This risk and challenge is compounded when one owns multiple dogs. The use of single use disposable bags is also a concern for the environment as landfills take on millions of pounds of plastic from single use bags every year.

It would be beneficial to provide an animal waste bag that masks the tactile sensation of the animal waste being picked up. It would be further beneficial if the animal waste bag allowed for multiple uses. One challenge in retrieving multiple wastes in one bag is the sequence in which the multiple chambers are to be used may be unclear, so it would also be beneficial if the animal waste bag provided a limited number of entry points for each use.

Also, in retrieving multiple wastes in one bag, the user may feel previously retrieved waste while attempting to retrieve additional waste. Thus, it would be further beneficial if the multiple-use bag masks the tactile sensation of the previous wastes.

SUMMARY

Disclosed herein is an improvement in disposable animal waste bags that helps conceal the temperature, texture, consistency, shape, and other sensations that arise during animal waste management.

The disposable bag's walls of material may include one or more surface modifications, the surface modifications including aspects and/or elements that help the walls of material deform in a predictable and/or structured manner and/or help to hide the sensations involved during the retrieval of pet waste. Such aspects and elements may include at least one face of the wall of material having printed inks or paints that create a contrast in material thickness, texture, or consistency. Additional ways to achieve this contrast include, but are not limited to: embossing and/or de-bossing of the wall of material; laminating paper or additional material to the wall of material; chemically or physically altering the texture of the wall of material; trapping air or additional material within the wall of material; chemically or physically altering or reinforcing certain areas of the wall of material with inks, laminated, or glued on materials; mechanically or heat bonding additional materials to the wall of material; scoring, cutting, and/or stretching the wall of material; or a combination of the previous methods or similar.

In one embodiment, an animal waste bag is made of two walls of material, which may be of the same or varying heights, size, and shape. The two walls may be sealed at the peripheral edges thereof with one open unsealed edge forming a pocket that may have a textured and/or modified surface on at least one side of the wall of material. The texture and/or modification may comprise the whole surface of the wall or part of the surface of the wall.

In operation, the user inserts their hand inside the open pocket and grasps the waste material. During retrieval, the wall of material deforms along pre-determined areas and conforms to the shape and size of the waste material while masking the unique organic consistency, texture, and shape of the waste material and relaying to the user the texture, impressions, and/or other sensations of the above-described aspects or elements on the wall of material. This allows for the wall of material to successfully hide the shape, texture, temperature, and consistency of the waste, helping to alleviate user discomfort.

In helping to retrieve multiple wastes in one bag, one embodiment may be made of three walls of material or more. Two walls of the same or varying heights of material may be sealed or bonded together at the peripheries thereof leaving an open end forming a pocket. Inside the open pocket may be one or more additional walls of material of various heights that divide the main pocket creating additional pockets. Additional pockets may also be created by adding additional walls of material to the exterior of the bag.

In operation, after the user inserts their hand into the open pocket to retrieve and contain the first animal waste, the waste's shape and consistency is masked by the pre-determined deformations or patterns on a wall of material that may be facing the waste matter, facing the user's hand, or both. After inversion of the used pouch to contain the waste matter, an additional unused open pocket is revealed and may be used to retrieve and contain additional waste matter.

Additional embodiments may have additional walls of material bonded together leaving one open edge forming additional open pockets to contain additional animal waste.

Some embodiments may include handles, adhesive seals, re-closable seals, and/or textured surfaces that enable interlocking of walls of material to help carry, seal in odors from, and contain the waste matter.

The animal waste bag may be made as a singular unit or made as multiple units adjacent to each other or on a single roll of material. When made as multiple units, they may be perforated to allow for detachment. One or more bags may also be rolled up, with or without a spindle, to provide ease of transport.

The multi-pouch, reversible bag described herein may be used to contain objects other than animal waste. For example, food items may be contained within the bag, and the bag may be used in, e.g., delis or butcher shops. In such embodiments, the walls of the bag may be made from food-safe materials, An embodiment comprises an animal waste bag, comprising: a first wall and a second wall joined at respective peripheries so as to form a first opening; and a third wall disposed between the first and second wall, wherein the third wall is configured to divide the animal waste bag into a first pouch and a second pouch, wherein the third wall is shorter than the first and second walls in at least one dimension; wherein each of the first and second pouches is reversible.

Implementations of this embodiment include: the first wall comprises a surface modification, the surface modification configured to alter the texture of the first wall; the surface modification comprises an embossing or a debossing of the first wall; the surface modification comprises additional material added to the first wall; the surface modification comprises a scoring or chemical alteration of the first wall; the first wall comprises at least two layers, and wherein the surface modification comprises additional materials between the layers of the first wall; the first wall comprises a second surface modification at a different location than the first surface modification; the third wall comprises a surface modification; the first wall comprises a surface modification, the surface modification configured to cause the first wall to deform along pre-determined areas; at least one additional wall disposed between the first and second walls, wherein the at least one additional wall is configured to form at least one additional pouch; the at least one additional wall is shorter than the other walls in the at least one dimension; at least one additional pouch exterior to the first and second walls; at least one of the first wall, the second wall, and the third wall comprises an adhesive strip; at least one handle; each of the first and second pouches is reversible.

An embodiment comprises a method of retrieving animal waste using an animal waste bag, the animal waste bag comprising two exterior walls and at least one interior wall, the walls forming at least two pouches, wherein the interior wall is smaller in at least one dimension than the exterior walls, the method comprising: retrieving and containing a first animal waste using a first pouch of the animal waste bag; inverting the animal waste bag so as to contain the first animal waste; and retrieving and containing a second animal waste using a second pouch of the animal waste bag.

Implementations of this embodiment include: at least one wall comprises a surface modification, and wherein the surface modification causes the at least one modified wall to deform along pre-determined areas during waste retrieval; at least one wall comprises a surface modification, and wherein the surface modification causes the at least one modified wall to alter the sensation of the animal waste during waste retrieval; at least one wall comprises a surface modification, and wherein the surface modification causes the at least one modified wall to alter the perceived shape of the animal waste during waste retrieval; at least one exterior wall and at least one interior wall comprise a surface modification; sealing the first pouch after retrieval of the first waste; the animal waste bag further comprises at least two handles, and the sealing comprises tying the handles; the sealing comprises tying off excess material above the first waste; the walls of the animal waste bag are configured to guide a user's hand into one of the at least two pouches.

An embodiment comprises an animal waste bag, comprising: a first wall and a second wall joined at respective peripheries so as to form a first opening; and a third wall disposed between the first and second wall, wherein the third wall is configured to divide the animal waste bag into a first pouch and a second pouch, wherein the third wall is shorter than the first and second walls in at least one dimension; wherein at least one of the walls shifts position from the interior to the exterior of the bag during inversion of at least one pouch.

Other features and advantages of the present invention will become apparent from the following more detailed description, which illustrate by way of example, the general principles of the invention. It should be known that the following description should not limit the invention to its specific embodiments or exact method of use or procedure but show the working principles of the invention.

BRIEF DESCRIPTION OF THE DRAWINGS

FIG. 5A is a surface view of at least one embodiment of a surface treatment of a wall of material.

FIG. 5B is a cross sectional view of a type of surface treatment for a wall of material.

FIG. 5C is a cross sectional view of a type of surface treatment for a wall of material.

FIG. 5D is a cross sectional view of a type of surface treatment for a wall of material.

FIG. 5E is a cross sectional view of a type of surface treatment for a wall of material.

FIG. 5F is a cross sectional view of a type of surface treatment for a wall of material.

FIG. 5G is a cross sectional view of a type of surface treatment for a wall of material.

FIG. 7A is an axonometric view of at least one embodiment with three walls and handles.

FIG. 7B is an axonometric section view of at least one embodiment with three walls and handles.

FIG. 7C is an axonometric section view of at least one embodiment with 5 walls and handles.

FIG. 7D is an axonometric section view of at least one embodiment made of a continuous wall of material.

FIG. 10D is an axonometric view of an embodiment in the process of retrieving an animal waste with a modified surface where the bag is inverted and contains one animal waste.

FIG. 10E is an axonometric section view of an embodiment in the process of retrieving an animal waste with a modified surface where the bag is inverted and contains one animal waste.

DETAILED DESCRIPTION

As used herein, a "surface modification" refers to a modification of a wall of material that affects one or more surfaces of the wall, and is not limited to modifications of one or more surfaces of the wall themselves. For example, the modified wall of material may include multiple layers, and the modification may be internal to the layers, e.g., air pockets formed within the wall.

Figure 1:
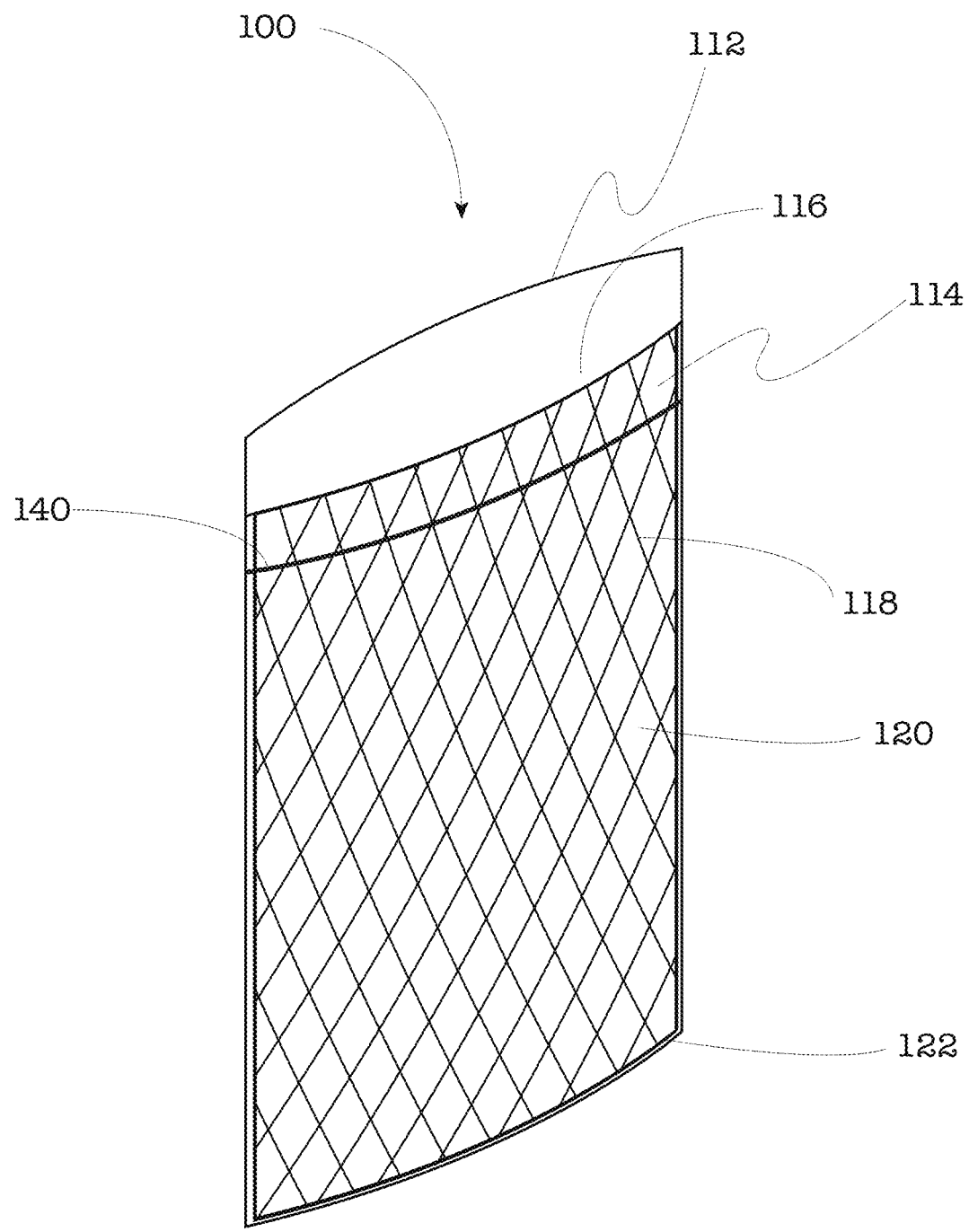
FIG. 1 is a perspective view of an animal waste bag according to at least one embodiment of the invention.

FIG. 1 illustrates an animal waste bag 100 comprising a wall of material 112 bonded to a second wall of material 114 at the peripheral edges 122 thereof, leaving one open edge to form an open pocket 116. At least one wall of material has a modification designed to help facilitate a predictable method of crumpling, folding, flexion, or bending. For example, a surface treatment affecting modified areas 118 may cause areas 120 to move in a predictable manner in relation to the modified areas 118. The modified areas 118 may be disposed across the entire surface of the wall of material or may be placed in specific areas across the surface of the wall of material 114. For example, the modified area 118 may be disposed on the lower portion of the modified wall of material where contact with the pet waste material is more likely. Another example is to have the modified area 118 be disposed on the upper portion of the modified wall of material to assist with controlling the inversion of the animal waste bag. Another example is to have the modified areas 118 on both the bottom and the top of the modified wall of material while maintaining the middle area unmodified, or modified by an alternative method. This configuration would allow the animal waste bag to fold, bend, deform, or flex in multiple ways to mask the shape and alter the sensation of retrieving pet waste. The modified areas may be on the outer surface, the inner surface, or both to aid in the alteration of the sensation of retrieving pet waste.

The wall of material 112 and wall of material 114 may be of different heights, widths, or shapes. The excess areas of material in the larger wall created by this difference may be used to fold over the opening 116 and seal the waste bag with either adhesive or a mechanical bond.

In method of use, the user inserts their hand into the open pocket 116, grasps the animal waste and allows for wall of material 112, wall of material 114, or both to deform in a predictable and/or structured manner along the areas where the surface has been modified 118. The difference in tactile sensation created by the modification is made apparent to the user as the wall of material conforms, flexes, and/or bends (based on the surface modification) under the pressure of the user's hand to surround the animal waste. The result is that the user may feel a different shape, texture, or temperature than that of the actual organically-shaped animal waste matter, e.g., the animal waste may feel like a polygonal mass or an organic shape different than that of the animal waste, the apparent temperature of the waste matter may be changed once the modified wall of material surrounds the waste matter, etc.

The user then inverts the animal waste bag to contain and store the animal waste. The user may engage the adhesive seal 140 or mechanical bond on the wall of material. Alternatively, the user may use the excess material of the bag above the retrieved waste and tie a knot to contain the waste therein.

Figure 2:
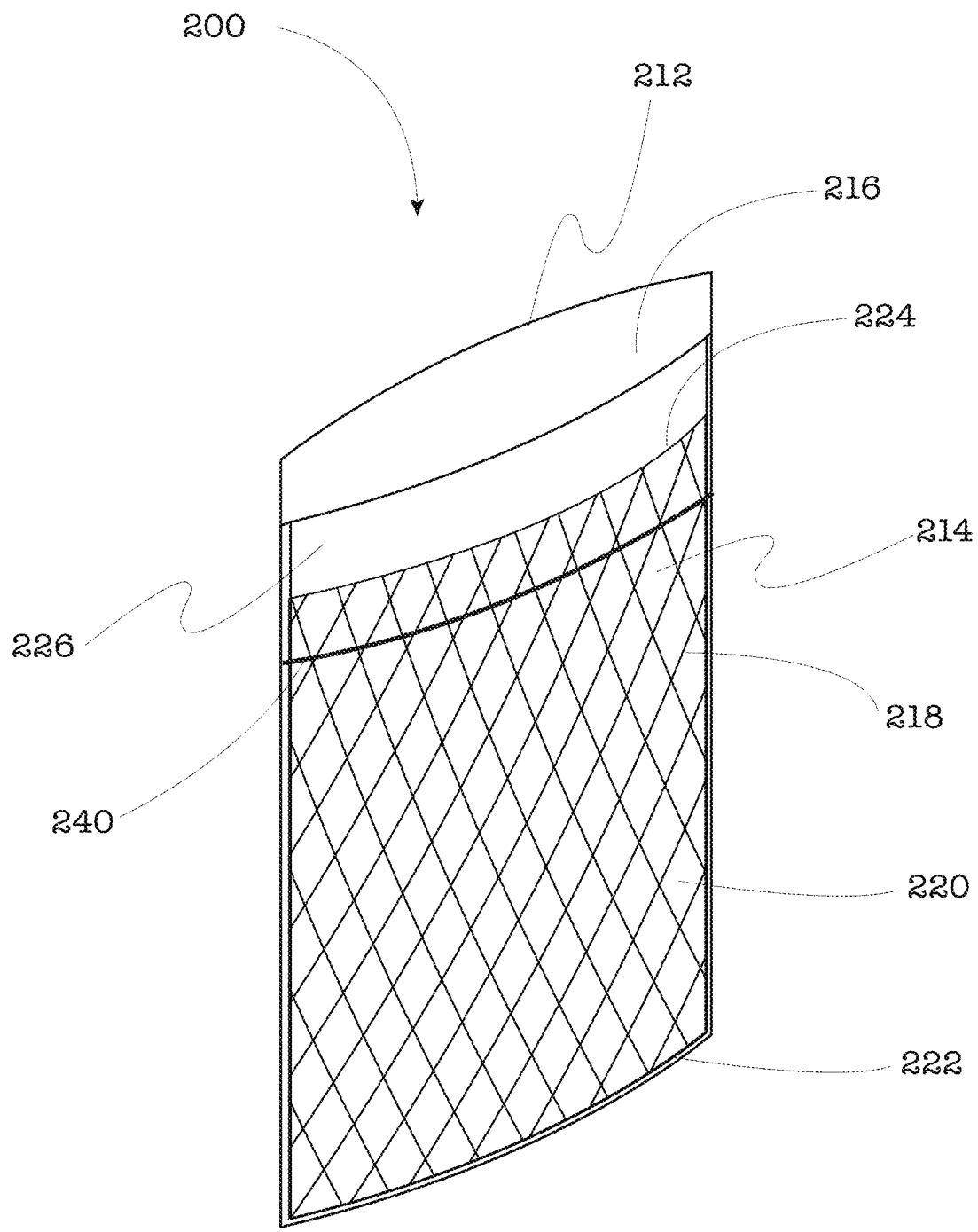
FIG. 2 is a perspective view of an animal waste bag according to at least one embodiment of the invention with an additional pouch.

FIG. 2 illustrates an alternative embodiment 200 including one or more additional walls of material 226 that form an additional pouch 224. All walls may be of different heights, widths, and/or shapes.

This embodiment comprises a first wall of material 212 bonded to a second wall of material 214 at the peripheral edges thereof 222, leaving one open edge to form an open pocket 216. The second wall of material 214 is bonded to a third wall of material 226 at the peripheral edges thereof, leaving one peripheral edge open to form a second open pocket 224. The wall 226 between the two exterior walls (212, 214) may be considered a shared wall between two pouches. At least one of the walls may have a modification to help mask the tactile sensation of pet waste retrieval. The wall of material 212 may have a different height than that of wall of material 214 or wall of material 226. Walls of material 214 and 226 may also have different heights.

In this embodiment, wall of material 214 may have a modified surface as described herein. It may be disposed across the complete surface of the wall of material, part of the surface, or in multiple areas of the surface. The modified surface may be on the outer surface of the walls of material, the inner surface, or both. While FIG. 2 illustrates only wall of material 214 having a surface modification, alternative embodiments may have additional walls (e.g., walls of material 212 and/or 226) that are modified. These additional modifications may be disposed on the entire wall, on part of the wall, or a combination of parts. Furthermore, the modification(s) of one wall may be disposed in a different area(s) than the modification(s) of another wall.

In operation, a user inserts their hand into either open pocket 216 or open pocket 224. The user then retrieves the pet waste matter and the modified wall of material 214 deforms, bends, and/or folds along predetermined areas as guided by the modification. Once the user grasps the waste matter, the pouch is inverted. The used pouch may then be sealed through an adhesive strip 240 or a mechanical bond. The user may also choose to use the excess material at the top of the bag to tie a knot and seal in the first waste. An additional waste matter may then be retrieved using the other unused open pouch. After sealing in the first waste matter, the user may then insert their hand into the second unused open pouch. The modified wall of material 214 may be used again to help mask the form and/or feel of the second waste matter during retrieval, e.g., through deformation, bending, and/or folding based on the modification. In alternative embodiments the wall of material 212 and/or shared wall of material 226 between the two pouches may be modified, in addition to or instead of wall 214, to aid in the obscuring the feel, shape, and/or temperature of the first waste and the second waste matter. It will be apparent to one of ordinary skill in the art that one wall of material having a modified surface may be sufficient to help obscure the feel and texture of waste matter during retrieval. Shared wall of material 226, in embodiments that have multiple walls and multiple pouches, can perform multiple functions such as helping obscure the sensations of previously retrieved waste matters, protecting the user from previously retrieved waste matters, and obscuring the sensation and feeling during the retrieval of the first and subsequent waste matters. After retrieval of the second waste matter, the user may use the excess material of the bag above the retrieved waste and tie a knot so as to seal in the second waste matter and/or the first and second waste matter combined.

Figure 3:
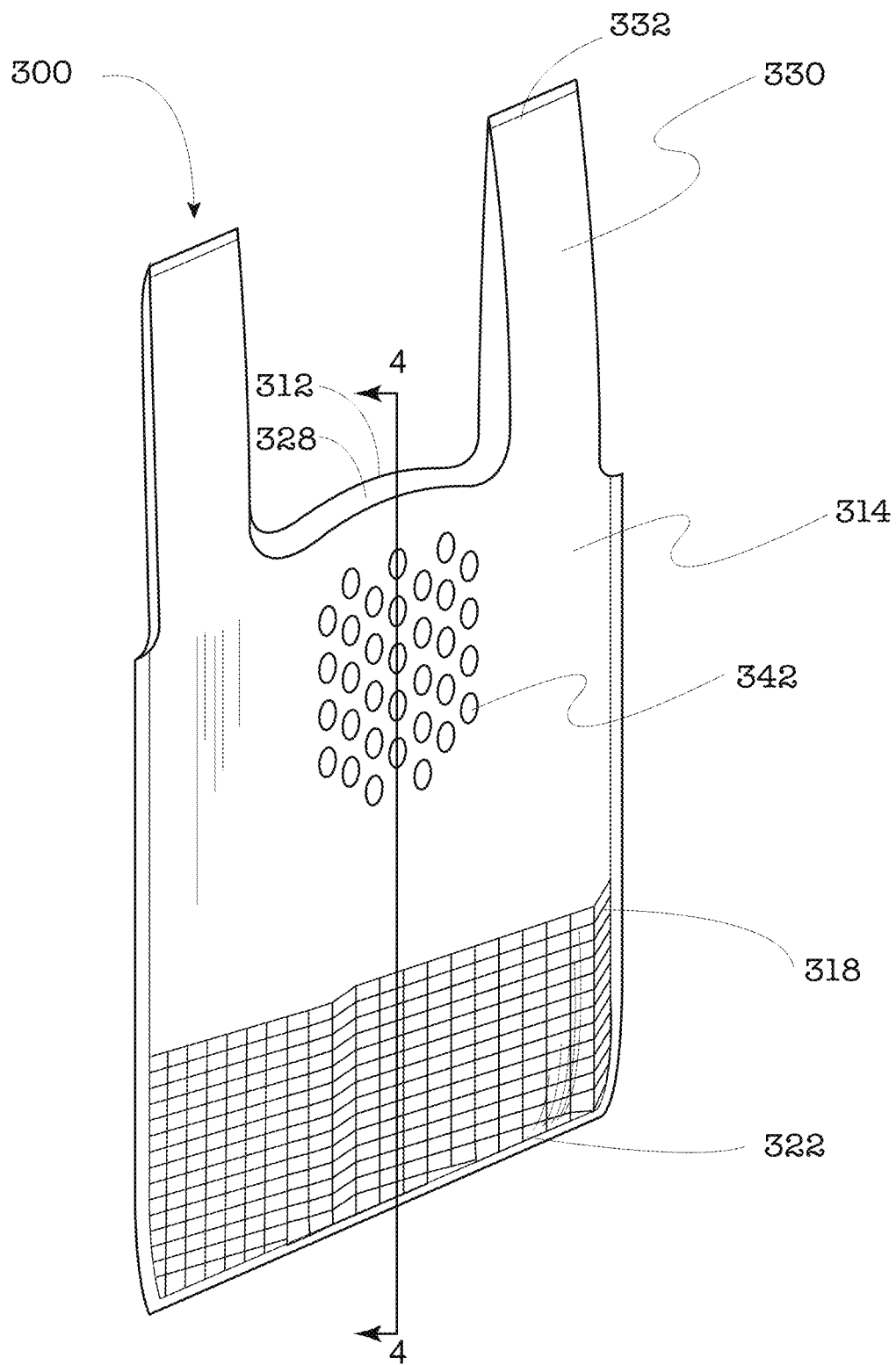
FIG. 3 is a perspective view of an animal waste bag according to at least one embodiment of the invention.
Figure 4:
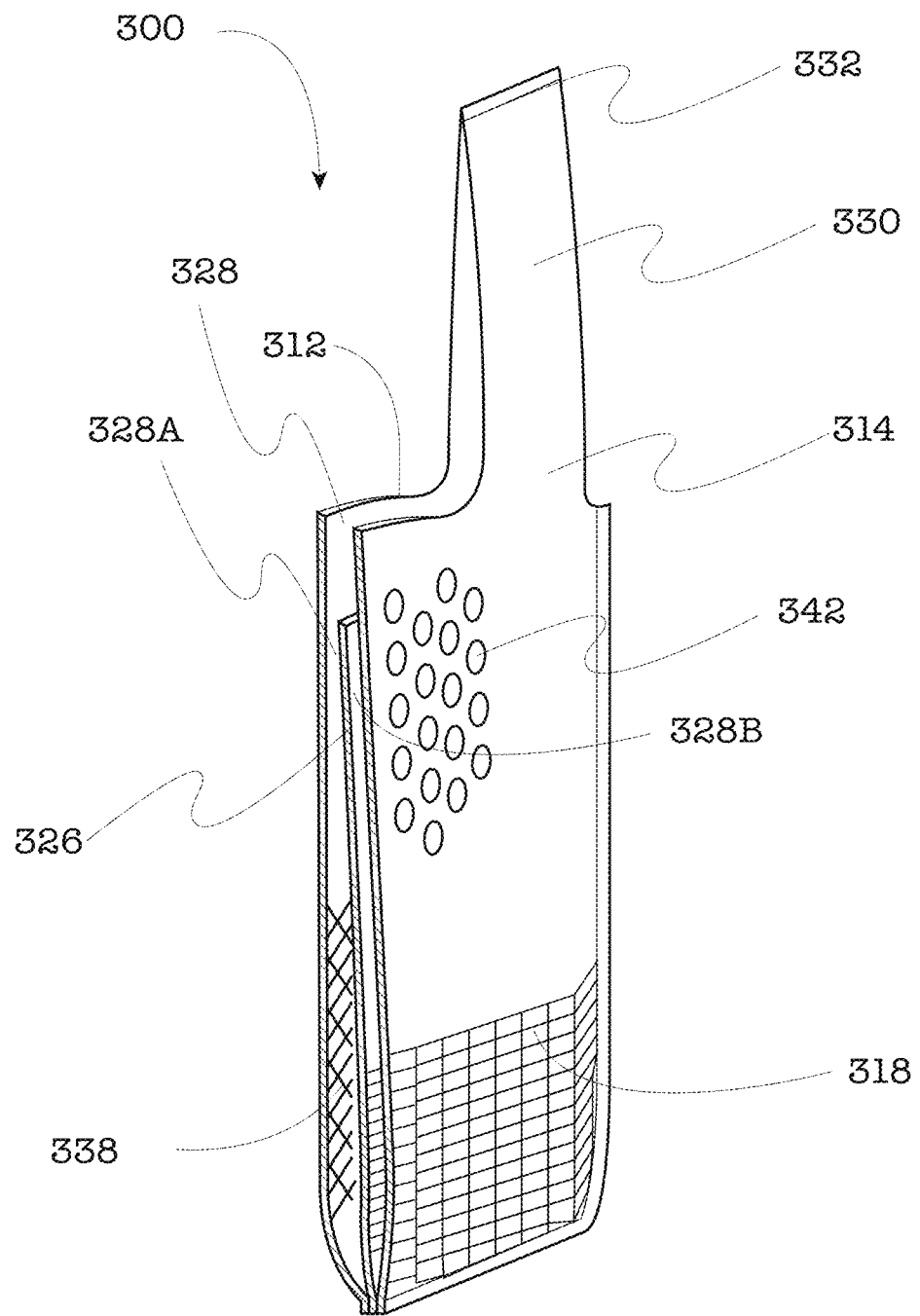
FIG. 4 is a cross sectional view of an animal waste bag according to at least one embodiment of the invention.

An alternative embodiment is illustrated in FIGS. 3 and 4. A wall of material 312 is bonded to wall of material 326, which is in turn bonded to wall of material 314, at the peripheral edges thereof 322, leaving an open edge to form a first opening 328. The shared wall of material 326 separates the interior area into two open pouches which can be accessed by the second opening 328A and third opening 328B. Wall of material 312 and shared wall of material 326 create a first pouch accessed through opening 328A, and wall of material 326 and wall of material 314 create a second pouch accessed through opening 328B. Each of the walls of material may have different heights, widths, and/or shapes.

The wall of material 326 may be modified 318 in the lower regions. This modification provides areas of guided deformation or crumple zones upon the surface of the wall of material 326.

This embodiment may also include handles 330. The handles may be used for carrying the bag or tying together and sealing the waste matter during the waste retrieval process. The handles may be formed by a wall of material folded upon itself and cut to shape or by two walls of material bonded together 332. An alternative embodiment with handles may be made by a post process by which additional pieces of material in the shape of handles are added onto the respective walls of material via heat sealing, sonic or heat welding, gluing, or other form of adhering process.

This embodiment's partial modification of a wall of material allows for the embodiment to have multiple areas with different deformations. In the process of waste retrieval, it may be desirable to fully mask the sensation of the waste and its texture. However, as the waste retrieval process typically uses only the lower part of the bag, the upper part of the bag may not need to have such modifications. Additional embodiments may include multiple surface modifications and different surface modifications that help the waste bag bend and deform in different areas depending on the need. Modified surface area 342 on wall of material 314 is one such area wherein the user may desire that particular region to bend and fold differently than modified area 318 to improve in grip, stretch, deformation, and folding while retrieving waste matter. The modified surfaces may be on the inner surface facing the user's hand or the outer surface facing the waste matter to be retrieved. The surface modifications may also be combined, positioned adjacent to one another, be on opposite sides of the same wall of material, opposite ends, and/or change or transform from one to another across the surface of a wall of material.

FIG. 4 is a cross sectional drawing of the embodiment illustrated in FIG. 3. The illustration shows the first opening 328 leading to two open pouches via a second opening 328A and a third opening 328B. The first opening 328 separates into the first open pouch and the second open pouch. The separate open pouches may be adjacent to one another and may share a wall of material. The shared wall of material 326 is of a different height than the first and/or second wall of material. All walls of material may be of different heights. An embodiment may have a shared wall 326 with a lower height than the other walls of material, which enables the user to initially enter their hand into a single opening 328, as opposed to having to decide between multiple openings as in previous waste bags. This lowered shared wall helps to guide the user's hand into one opening and eliminate user error in choosing which open pouch to use first.

The embodiment may also have an additional modified surface 338 on a wall of material. This modified surface may face inward toward the center of the bag or be located on the surface of the wall of material facing outward. In an embodiment, either (or both) surface of the shared wall of material 326 may include a surface modification, so after retrieval of a first waste and inversion of the bag, the shared wall 326 (which is now on the exterior of the bag) can help mask the tactile sensation, shape, and/or temperature of a second retrieved animal waste.

FIGS. 10A-10K illustrate an example use of this embodiment. Starting with FIG. 10A, the user's hand is guided into one opening only by the two taller exterior walls (312 and 314) and enters into the opening 328.

The first opening separates into opening 328A and opening 328B, allowing the user a choice as to which pouch to use. The user may choose to use the first pouch formed from wall of material 312 and shared wall of material 326 or the second pouch formed from shared wall of material 326 and wall of material 314 for retrieval of the first waste matter. However, the pouches may be used in any order, so the user's choice of which pouch to use first is immaterial. For demonstrative purposes, the user enters the first pouch through opening 328A which is between wall of material 312 and wall of material 326.

Figure 10A:
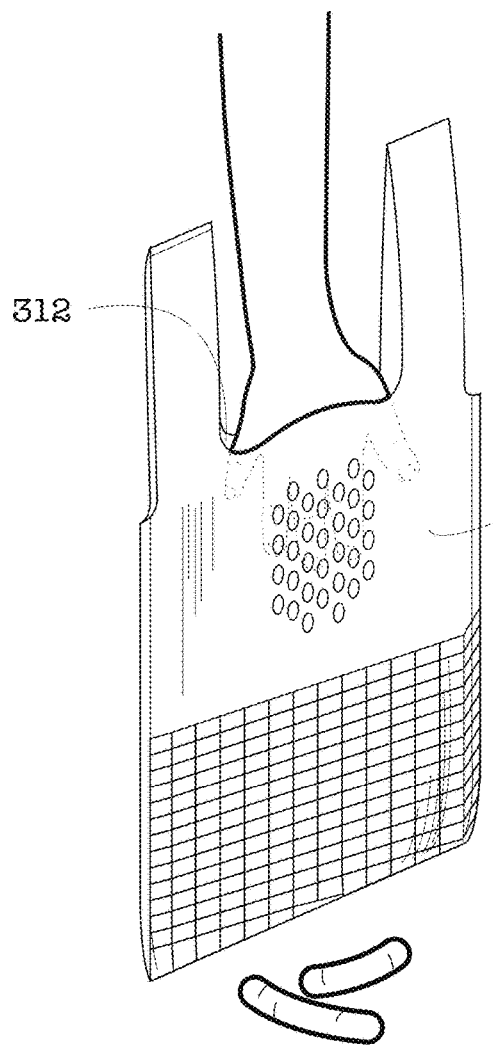
FIG. 10A is an axonometric view of an embodiment in the process of retrieving an animal waste with a modified surface where the hand enters the embodiment through a singular opening.
Figure 10B:
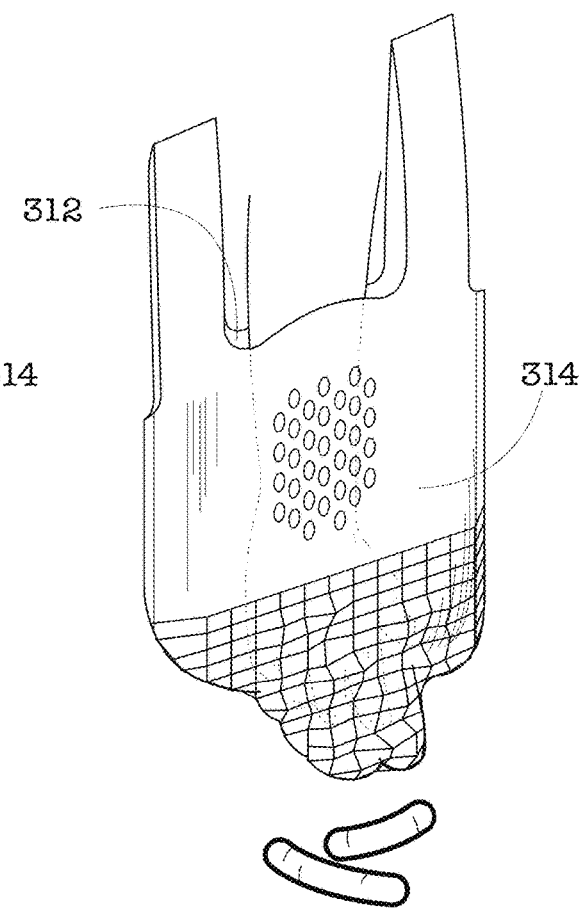
FIG. 10B is an axonometric view of an embodiment in the process of retrieving an animal waste with a modified surface where the hand deforms the bag along pre-determined areas to retrieve the animal waste.

With reference to FIG. 10B, the user then retrieves the first waste matter via the first pouch.

Figure 10C:
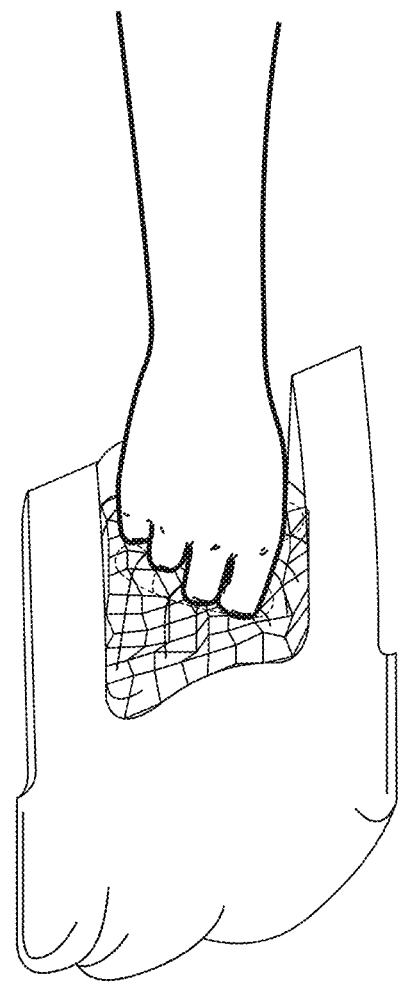
FIG. 10C is an axonometric view of an embodiment in the process of retrieving an animal waste with a modified surface where the hand retrieves the animal waste and inverts the bag.

In FIG. 10C, the user inverts the first pouch using the modified walls of material to help mask the tactile sensation, temperature, and/or shape of the waste matter.

FIGS. 10D and 10E show a perspective view and a sectional view of the embodiment with the first waste matter retrieved and the first pouch inverted. As illustrated, wall of material 314 and wall of material 312 contain the waste material and shared wall of material 326 comes to the exterior of the embodiment via inversion of the first pouch. The shared wall of material 326 includes a modification on the lower part thereof.

Figure 10F:
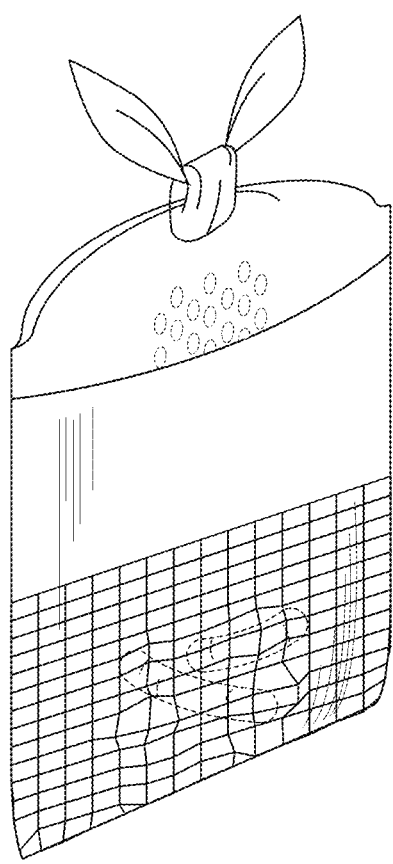
FIG. 10F is an axonometric view of an embodiment in the process of retrieving an animal waste with a modified surface where the user has tied the handles of the bag to seal in the waste.

Wall of material 314 (formerly an exterior wall) becomes a shared wall of material between the pouch containing the waste matter and the unused pouch after the first inversion. The new shared wall of material 314 includes a modification of the lower part thereof. As illustrated in FIG. 10F, the user may then use the handles to tie a knot to seal in the first waste matter.

Figure 10G:
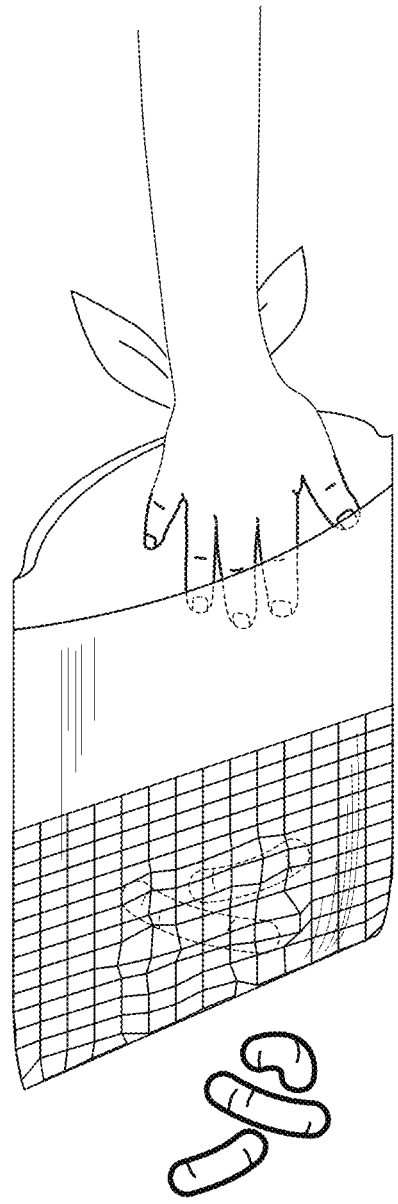
FIG. 10G is an axonometric view of an embodiment in the process of retrieving an animal waste with a modified surface where the user inserts their hand into a newly revealed open pocket to retrieve a second animal waste.

In FIG. 10G, the user may now enter their hand through a second open pouch that has come to the exterior of the bag to retrieve the second waste matter.

Figure 10H:
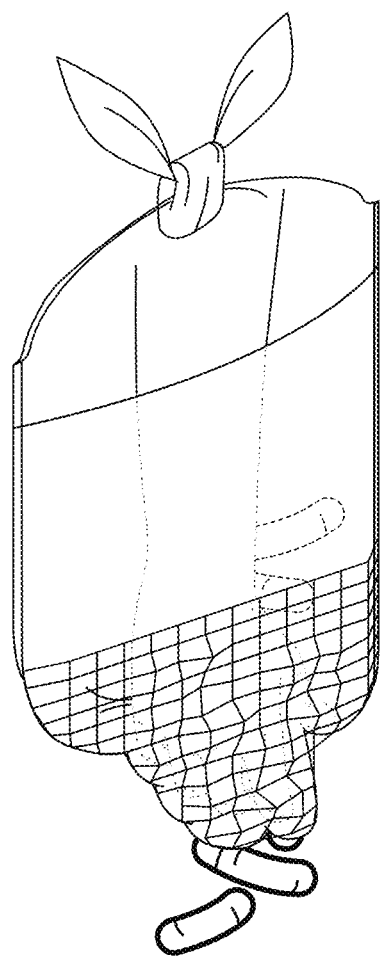
FIG. 10H is an axonometric view of an embodiment in the process of retrieving a second animal waste with a modified surface where the user deforms the second pouch in a predictable manner.

In FIG. 10H, the user uses the modified wall of material 326 to mask the sensation of the second waste matter while the new shared wall 314 masks the sensation of the previously retrieved first waste matter. The second pouch is then inverted to contain the second waste matter.

Figure 10I:
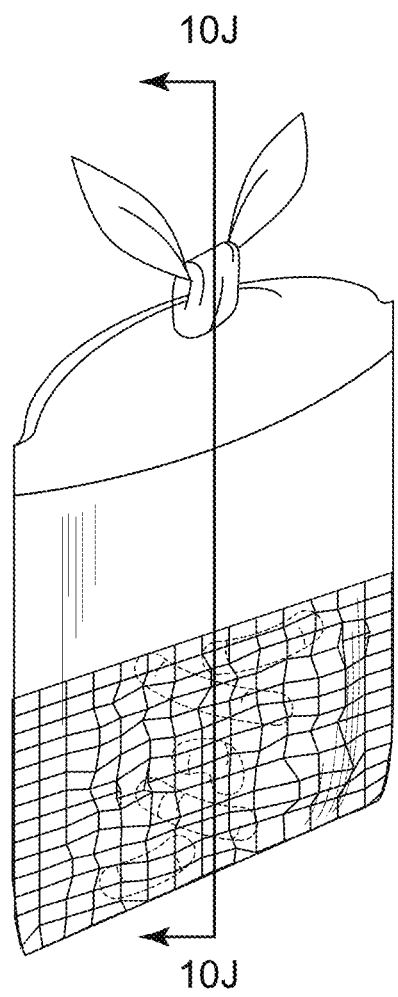
FIG. 10I is an axonometric view of an embodiment in the process of retrieving an animal waste with a modified surface where the bag contains two waste articles.
Figure 10J:
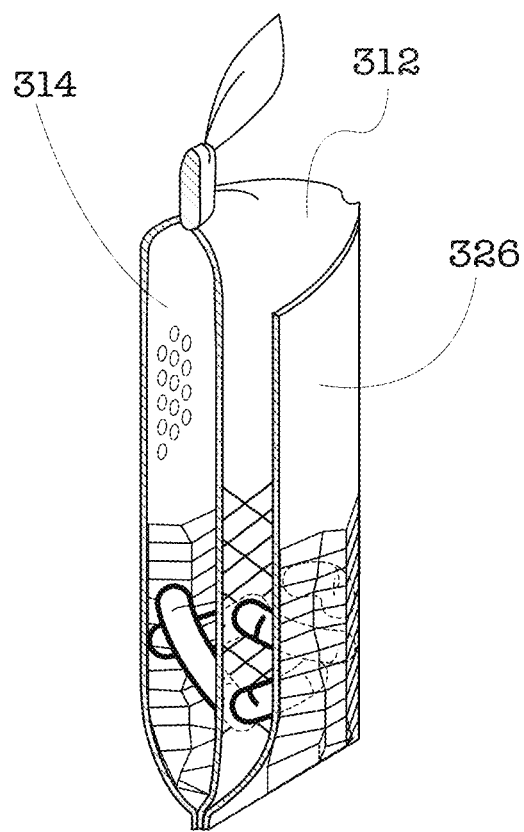
FIG. 10J is an axonometric section view of an embodiment in the process of retrieving an animal waste with a modified surface where the bag contains two waste articles.

FIGS. 10I and 10J show a perspective view and a sectional view of the embodiment after the retrieval of both the first and second waste matters.

After the second inversion, wall of material 314 is again an exterior wall and wall of material 312 becomes the shared wall between the two used pouches. Wall of material 326 remains at an exterior wall after the second inversion.

Figure 10K:
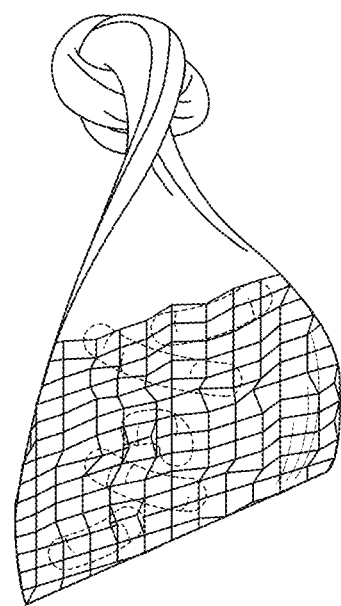
FIG. 10K is an axonometric view of an embodiment in the process of retrieving an animal waste with a modified surface where the user has used the excess material of the bag to form a knot that seals the second waste.

In FIG. 10K, the user may then tie a knot with the excess material above the retrieved wastes as to seal in the second waste matter. Thus both waste matters are retrieved and sealed and leakage is prevented.

The surface modification enabling the predetermined deformation during waste retrieval may comprise one or more of: embossing, de-bossing, lamination, chemical or physical alteration, material (including air) trapped between layers, ink, heat- or mechanically-bonded material, scoring, cutting, and stretching. The walls of material may comprise sheets of different thicknesses bonded to each other. For example, the lower portion used to retrieve waste matter may be of a thicker gauge of plastic bonded to an upper portion of thinner plastic. Furthermore, the thicker gauge lower portion and the thinner gauge upper portion may have similar surface modifications or different surface modifications.

FIGS. 5A through 5G illustrate possible surface modifications that enable for the predetermined deformation during retrieval of animal waste matter. In one embodiment, the modification may comprise modified areas 118 surrounding the shapes 120 (as illustrated in FIG. 1) that allow for the modified areas to bend, flex, and deform differently than the shapes 20. Shapes 120 can be organically shaped, polygonal, or geometric. They may include circles, ellipses, and similar shapes of different sizes arranged in a geometric, repeatable, or a non-repeatable pattern.

Alternatively, the modified areas may comprise shapes 150, with unmodified areas 144 surrounding the shapes.

The surface modification may also comprise a drawing or cartoon depicting figures, faces, persons, words, and/or symbols.

FIGS. 5B through 5G show cross sections of possible wall treatments or surface modifications.

FIG. 5B shows a cross section of a modified wall of material that has different heights for the shapes 150 and the area surrounding the shapes 144. This modification may be achieved by embossing the material with a male and/or female die, roller die, or other means that imparts a difference in surface height on the wall of material between the modified areas (shapes 150) and the unmodified areas 144. Different textures on the material may also be achieved through use of the die or through abrasion, sanding, flex deformation, or creasing of the wall of material.

FIG. 5C illustrates a cross section of a wall of material bonded to additional material 152. The additional material 152 may be of the same material as the wall, or of a different material that is stiffer, of a different tactile sensation, or modified in a way to deform differently from the wall of material. The additional material 152 may add additional qualities such as waterproofing, absorbency, added stiffness, color, scent, or any other characteristic that the wall of material does not have. It may be disposed across the entire area of the wall of material or in selected regions such as only laminated/bonded to the shapes 150 while allowing for the surrounding areas 144 to maintain the bending or folding characteristics of the wall of material.

Example additional materials may include plastics (e.g., high-density polyethylene (HDPE), low-density polyethylene (LDPE), petroleum-based plastics, or plant-based plastics, etc.), paper products (e.g., paper, cardboard, etc.).

FIG. 5D illustrates a cross section of a wall of material that is formed of two layers of material laminated together trapping one or more air pockets 154 within. The air pockets may be separated into distinct separate islands or multiple islands joined together which allow for air to pass between each other during deformation and handling. The air pockets may bend and deform along with the wall of material without diffusing the air to the surrounding outside environment.

FIG. 5E illustrates a cross section of a wall of material that is formed of two layers of material laminated together with an additional material 156 sandwiched between the layers. The additional material may help add stiffness, regulate temperature transference, provide a different tactile sensation to the user, or help to reinforce the walls of material.

FIG. 5F illustrates a cross section of a wall of material with surface modifications that have variations in height and form that are its negative and positive equivalent on opposite sides. This may be achieved with a male and female die or roller pressed onto the wall of material which imbues each surface with an embossed design on one side and an additional negative shaped deboss on the other.

FIG. 5G illustrates a cross section of a type of modification where the shapes 158 are raised from the surface of the wall of material through a post process. This can be achieved through printing with inks, paints, glues, silicones, or other liquid or viscous substance adhered to the surface of the wall of material. Preferably the liquid or viscous substance is of a nature such that once dried or cured, it will impart a different quality of stiffness, tactile sensation, texture, operability, foldability, bend-ability, or similar characteristic to the wall of material on which it is applied compared with the surrounding area 144.

Example paints may include acrylic or oil paints, water based paints, latex paints, etc. Example inks may include water based inks, latex inks, rubberized inks, puff inks, etc. Example glues may include water based adhesives, cyanoacrylate, polyvinyl acetate, epoxy, polyurethane, natural adhesives such as unvulcanized gum rubber, synthetic rubbers such as latex, adhesives which may be combined with a solvent, etc. Example silicones may include high temperature vulcanized silicone, liquid silicone, room temperature vulcanized silicone, etc.

The surface of the wall of material may also be modified by heat welding, bonding, or gluing additional material that imparts a height and/or tactile difference to the wall of material. It may even be of the same material that when layered on top of each other will impart a different stiffness than the surrounding area 144 that is not modified.

Figure 6A:
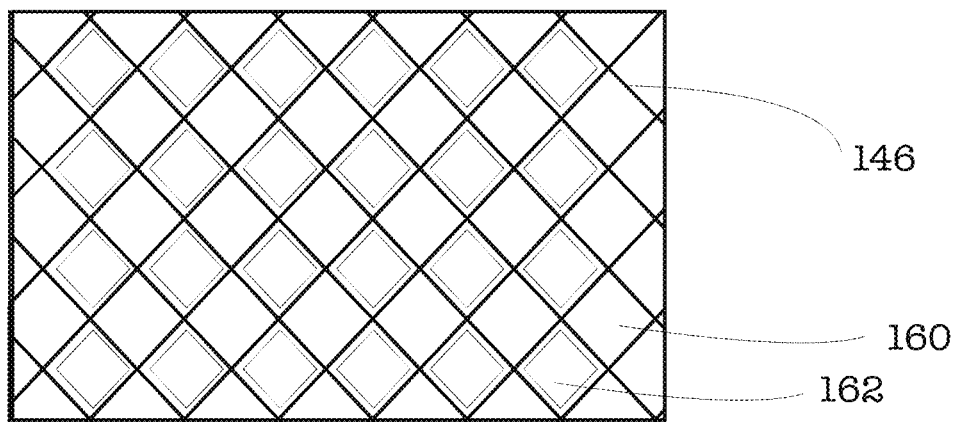
FIG. 6A is a surface view of at least one embodiment of a surface treatment of a wall of material.

FIG. 6A illustrates a wall of material wherein the surface modifications 146 are debossed lines that allow for predetermined areas to flex and bend differently than the areas that do not have a deboss 160. In an embodiment, some non-debossed areas 160 may also have a raised emboss 162 that may increase the different tactile sensation and flex and bend characteristics as compared with surrounding areas.

Figure 6B:
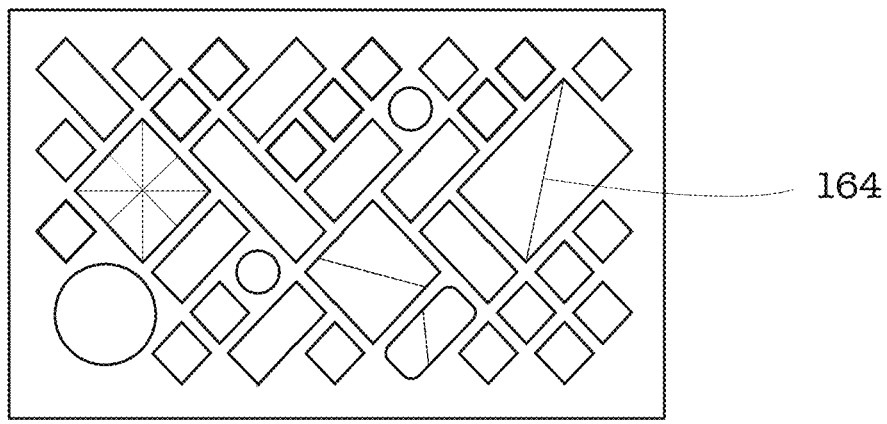
FIG. 6B is a surface view of at least one embodiment of a surface treatment of a wall of material.

FIG. 6B illustrates a surface treatment wherein a mix of small, medium, and large shapes are patterned together. As illustrated, the shapes may include squares, rectangles, circles, and rounded rectangles. Other geometric or organic shapes may also be used. In one embodiment, the larger shapes are modified 164 for additional flexion and bendability using one of the modification techniques described herein. This additional modification allows for the bag to bend and deform in ways that may not be apparent from the shapes or dominant visual graphic.

Figure 6C:
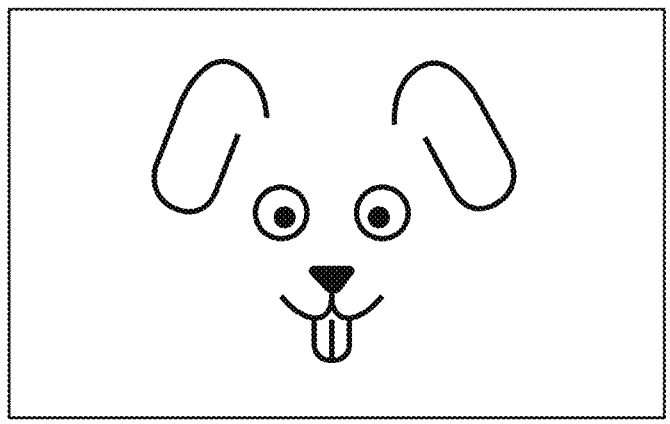
FIG. 6C is a surface view of at least one embodiment of a surface treatment of a wall of material.

FIG. 6C illustrates that a line drawing or cartoon may also be used to produce the desired deformation effect. The lines and shapes may be created using any of the modification techniques described herein. For example, for the drawing of the dog, the eyes may be reinforced with an additional material, and the nose may be embossed with a die plate. The tongue may be abraded, chemically treated, or pressed with a texture as to impart a different tactile sensation to the user. This combination of methods to treat the surface of a wall of material is not limited to the methods mentioned but serves as an example of the ways to produce predictable deformation and obscuring of tactile sensation during the retrieval of pet waste. The above combinations may be accomplished with a figurative design.

In any embodiment, the surface modification or additional material may add waterproofing, absorbency, stiffness, color, scent, texture, and/or any other characteristic that the wall of material does not have. The surface modification may also regulate temperature transference from grasped items (e.g., animal waste), provide a different tactile sensation to the user than that of a grasped item, change the apparent shape of a grasped item, or help to reinforce the walls of material. Any surface modification or wall treatment that does not include material between the layers of the wall may be applied to one or both sides of the wall of material.

FIGS. 7A and 7B show an alternative embodiment 700 wherein there are three walls of material bonded together at the periphery thereof, leaving one side open to form a pouch with handles, the pouch dividing into two interior pouches.

A wall of material 712 is bonded to a shared wall of material 726, which is bonded to a wall of material 714, wherein the walls 712 and 714 form the exterior walls. The exterior walls 712 and 714 may form handles 730. The shared wall 726 may be of shorter height than the walls 712 and 714, allowing the embodiment to guide the user's hand into a single opening 728 that separates into two openings 728A and 728B. The shared wall 726 may have one or more adhesive strips 740 to be used for sealing an opening after an animal waste is retrieved.

FIG. 7C shows an alternative embodiment wherein there are multiple shared walls 726, 726A, 726B between the two exterior walls (712, 714). Wall of material 712 and wall of material 714 may be of a different height or taller than the interior shared walls. Each wall of material may have one or more adhesive strips 740 to help seal the pouches after retrieval of animal waste and inversion of said pouch.

FIG. 7D shows a section view of an alternative embodiment that may be made of one sheet of material that is folded upon itself multiple times and sealed at its respective peripheral edges leaving one edge or multiple edges open to form a pouch or multiple pouches.

In this example, a single sheet of material forms exterior wall 712, wall of material 714 and shared wall of material 726. Shared wall 726 may be formed from the sheet of material folded upon itself. The walls of material 712, 714, and 726 are sealed at their respective edges 722, leaving one edge open to form opening 728, which leads into openings 728A and 728B. The edges opposite of opening 728A and 728B may be sealed to shared wall 726 respectively or may be left unsealed. Due to the walls of material being formed from a continuous sheet folded upon itself, a closed bottom is naturally formed opposite openings 728A and 728B. The continuous wall of material may also be folded upon itself to form handle 730. In this embodiment, the single sheet of material may start as a tube or circle of material, e.g., a tube of polyethylene.

Figure 7E:
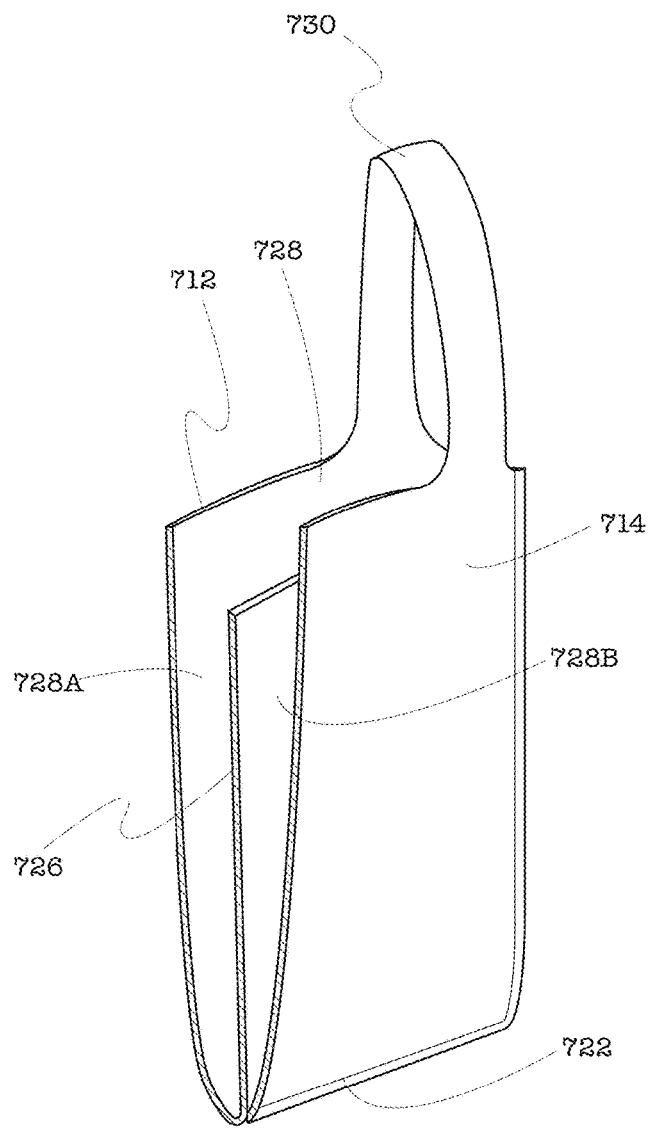
FIG. 7E is an axonometric section view of at least one embodiment made of a continuous wall of material folded upon itself.

FIG. 7E shows a section view of an alternative embodiment wherein one sheet of material is folded upon itself and sealed at respective edges leaving one edge left unsealed to form an opening which leads to multiple pouches.

In this example, a sheet of material may be folded twice upon itself, once to form a handle 730 at the top of the waste bag, and once more at the bottom, forming a pouch with opening 728A. Wall of material 712 and shared wall of material 726 may be sealed at their respective edges leaving one edge open to form a pouch.

An additional pouch with opening 728B may be formed by having wall of material 714 sealed to the edges of the shared wall of material 722, leaving one respective edge open.

Opening 728 may be formed by having walls of material 712 and 714 sealed at the respective edges thereof leaving one side open. In an embodiment, walls of material 712 and 714 may have a dimension that is greater in one aspect than shared wall of material 726 to form openings 728A and 728B.

Figure 8:
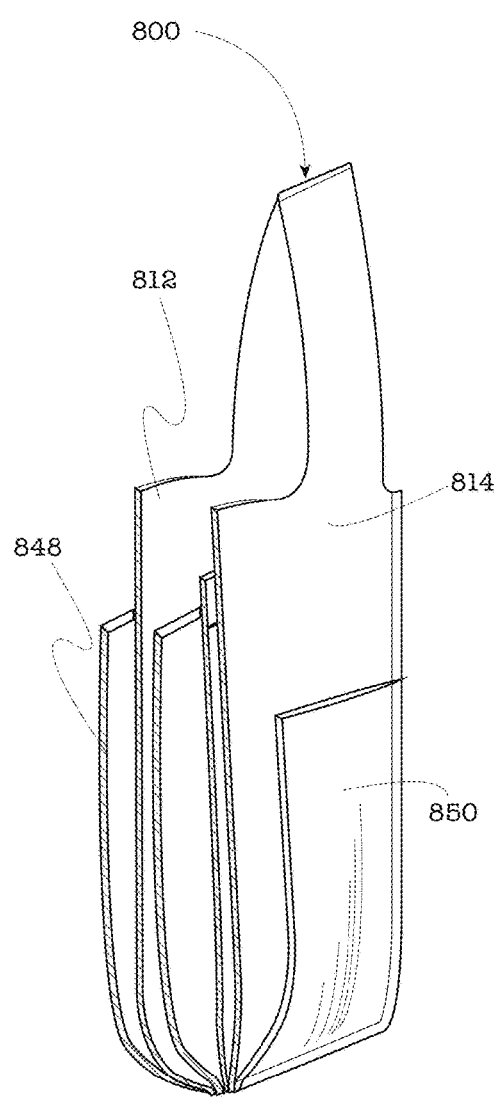
FIG. 8 is an axonometric view of at least one embodiment with 6 walls and multiple shared walls and handles.

FIG. 8 is a sectional view of an alternative embodiment 800 with additional walls of material that may be bonded to an embodiment's exterior walls' peripheral edges creating additional pouches and additional shared walls which may be used to retrieve and contain additional waste matters. For example, additional wall of material 848 is bonded at its periphery to wall of material 812 to create an additional exterior pouch and additional wall of material 850 is bonded to wall of material 814 at its periphery to create a secondary additional pouch to retrieve and store animal waste matter. Each additional wall of material may be of different height than other walls of material.

Figure 9A:
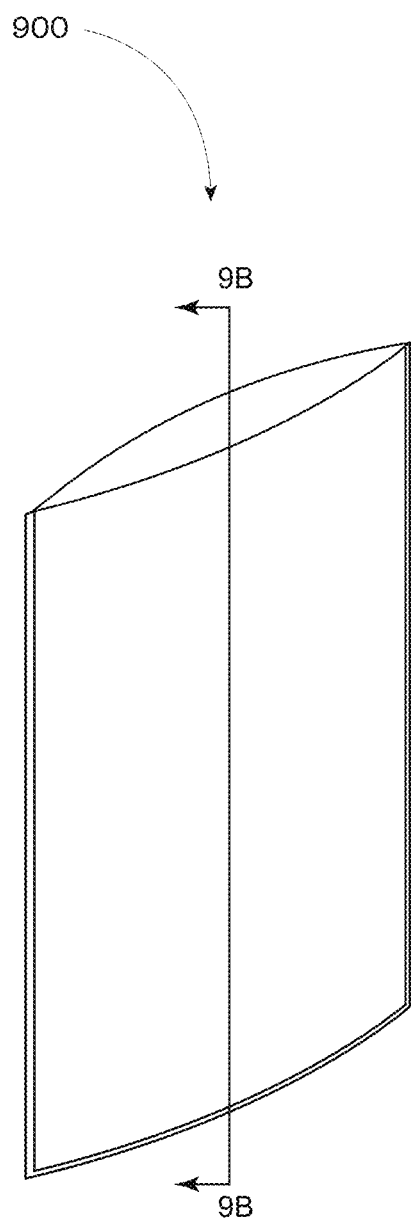
FIG. 9A is an axonometric view of at least one embodiment with three walls.
Figure 9B:
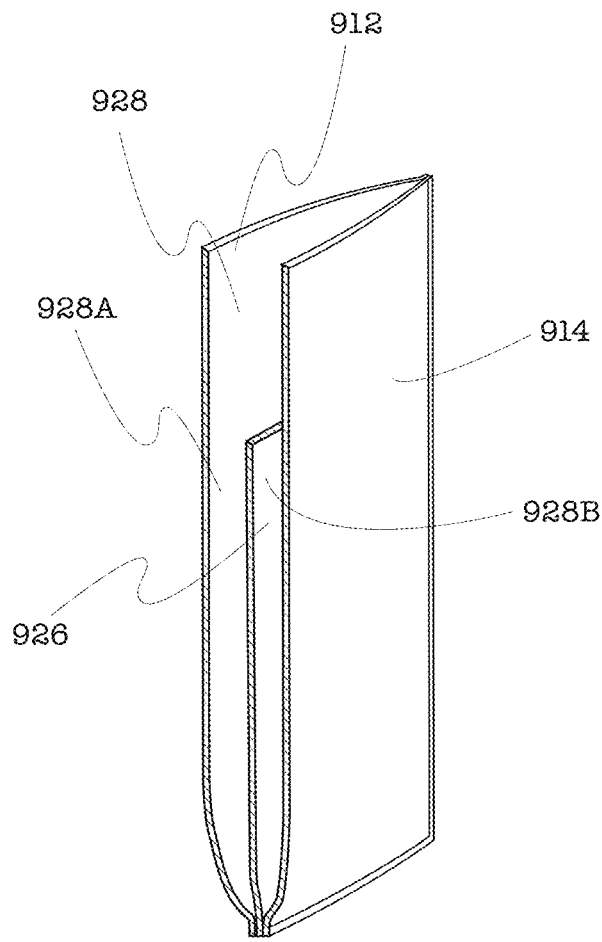
FIG. 9B is an axonometric section view of at least one embodiment with three walls.

FIGS. 9A and 9B show an embodiment 900 that has a first exterior wall of material 912, a shared wall of material 926, and a second exterior wall of material 914 bonded at the peripheral edges thereof leaving one side open as to form a pouch. The wall of material 926 is a shared wall of material and is of a shorter height than wall of material 912 and wall of material 914. Wall of material 912 and wall of material 914, which are taller than wall of material 926, form the first opening 928 and act as guide walls to help the user insert their hand into the waste bag. These guide walls help to simplify the operation of the waste bag by eliminating user error as to which opening to enter into first.

This embodiment's first opening 928 leads to a second opening 928A and a third opening 928B and gives the user the choice of which pouch to use first.

In use, the user inserts their hand into the opening 928 and chooses which of the openings 928A and 928B to enter. After retrieval of the first waste, the user inverts the pouch created by wall of material 912 and wall of material 926.

The user may then choose to tie a knot with the excess material of the bag atop the retrieved waste to seal in the first waste material. The user may then insert their hand into the second open and unused pouch to retrieve the second waste material. After retrieval of the second waste and inversion of the second pouch, the user may then use the excess material of the bag atop the retrieved waste matters and tie a knot to seal in the second (and first) waste material. It should be understood that the user may alternatively choose not to tie a knot after the first waste and carry the bag open. They user may choose to tie a knot only after the retrieval of the second waste to seal in the both waste matters or not at all. The user has the choice to perform these operations in sequence or out of sequence, skip certain actions, or do them in reverse as they prefer.

The processes disclosed herein are not to be interpreted as requiring any specific order unless the performance of one step is necessary for the performance of a subsequent step. A user may complete the steps in any order or skip certain steps. For example, the user may invert the bag prior to retrieving waste articles, prefer to use certain pouches, a certain bag configuration, or preferred walls of materials that have certain prints or textures prior to using other pouches or walls of materials. The user may also prefer to seal a given pouch only after all pouches are used instead of after each retrieval of waste, etc.

The disclosed multi-pouch bags may be used for a variety of purposes, and are not limited to the retrieval of animal waste. For example, the disclosed embodiments may be used in various foodservice applications, e.g., in a deli or butcher shop, to enclose food items, e.g., sandwiches, meat products, etc. In such embodiments, the walls of material and the wall modification will comprise food safe materials. Examples of adequate food safe material complying with FDA regulation Sec. 177.1520 of the Olefin polymer guidelines include virgin, non-recycled low density polyethylene or LDPE; plastics that do not contain dyes, additives, or recycled plastic deemed harmful to humans; and formulations of 100% post-consumer recycled Polypropylene plastic consisting of formulations containing up to 30% recycled post-consumer recycled LDPE.

In embodiments where adhesive strips are used to seal pouches, the adhesive to bond two adjacent walls is separated from the food item by a removable barrier such as an oiled or waxed paper (or similarly coated material), plastic film, or other type of material that prevents adhesion to the immediate adjacent wall and to the food item. After the removable barrier is removed, the adhesive strip may be immediately applied to the adjacent wall to prevent adhesion to the food item contained within the pouch. This type of removeable barrier may also be used in previously stated uses for sealing pouches with retrieved waste matter.

Various embodiments are described in this specification, with reference to the details discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials, or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. An animal waste bag, comprising:
   a first wall and a second wall joined at respective peripheries so as to form a first opening; and
   a third wall disposed between the first and second wall, wherein the third wall is configured to divide the animal waste bag into a first pouch and a second pouch, wherein the third wall is shorter than the first and second walls in at least one dimension, wherein the first pouch and the second pouch are both accessible through the first opening;
   wherein each of the first and second pouches is reversible.

2. The animal waste bag of claim 1, wherein the first wall comprises a surface modification, the surface modification configured to alter a texture of the first wall.

3. The animal waste bag of claim 2, wherein the surface modification comprises an embossing or a debossing of the first wall.

4. The animal waste bag of claim 2, wherein the surface modification comprises additional material added to the first wall.

5. The animal waste bag of claim 2, wherein the surface modification comprises a scoring or chemical alteration of the first wall.

6. The animal waste bag of claim 2, wherein the first wall comprises at least two layers, and wherein the surface modification comprises additional materials between two of the at least two layers of the first wall.

7. The animal waste bag of claim 2, wherein the first wall comprises a second surface modification at a different location than the first surface modification.

8. The animal waste bag of claim 2, wherein the third wall comprises a surface modification.

9. The animal waste bag of claim 1, wherein the first wall comprises a surface modification, the surface modification configured to cause the first wall to deform along pre-determined areas.

10. The animal waste bag of claim 1, further comprising at least one additional wall disposed between the first and second walls, wherein the at least one additional wall is configured to form at least one additional pouch.

11. The animal waste bag of claim 1, wherein at least one of the first wall, the second wall, and the third wall comprises an adhesive strip.

12. The animal waste bag of claim 1, further comprising at least one handle.

13. A method of retrieving animal waste using an animal waste bag, the animal waste bag comprising two exterior walls and at least one interior wall, the two exterior and the at least one interior walls forming at least two pouches, wherein the exterior walls of the animal waste bag are configured to guide a user's hand into one of the at least two pouches, wherein each of the at least two pouches is accessible through a single opening, wherein the interior wall is smaller in at least one dimension than the exterior walls, the method comprising:
retrieving and containing a first animal waste using a first pouch of the animal waste bag;
inverting the animal waste bag so as to contain the first animal waste; and
retrieving and containing a second animal waste using a second pouch of the animal waste bag.

14. The method of claim 13, wherein at least one wall comprises a surface modification, and wherein the surface modification causes the at least one modified wall to deform along pre-determined areas during waste retrieval.

15. The method of claim 13, wherein at least one wall comprises a surface modification, and wherein the surface modification causes the at least one modified wall to alter a sensation of the first or second animal waste during waste retrieval.

16. The method of claim 13, wherein at least one wall comprises a surface modification, and wherein the surface modification causes the at least one modified wall to alter a perceived shape of the first or second animal waste during waste retrieval.

17. The method of claim 13, further comprising sealing the first pouch after retrieval of the first animal waste.

18. The method of claim 17, wherein the animal waste bag further comprises at least two handles, and the sealing comprises tying the handles.

19. The method of claim 17, wherein the sealing comprises tying off excess material above the first animal waste.

20. An animal waste bag, comprising:
a first wall and a second wall joined at respective peripheries so as to form a first opening, the first and second wall collectively defining an interior and an exterior of the bag; and
a third wall disposed between the first and second wall, wherein the third wall is configured to divide the animal waste bag into a first pouch and a second pouch, wherein the third wall is shorter than the first and second walls in at least one dimension, wherein the first pouch and the second pouch are both accessible through the first opening;
wherein at least one of the walls shifts position from the interior to the exterior of the bag during inversion of at least one pouch.

* * * * *